(12) United States Patent
    Shadwell

(10) Patent No.: US 9,096,287 B2
(45) Date of Patent: Aug. 4, 2015

(54) APPARATUS AND METHOD FOR ROUTING BICYCLE CONTROL CABLES

(71) Applicant: Douglas Gregg Shadwell, Stellenbosch (ZA)

(72) Inventor: Douglas Gregg Shadwell, Stellenbosch (ZA)

( * ) Notice: Subject to any disclaimer, the term of this patent is extended or adjusted under 35 U.S.C. 154(b) by 13 days.

(21) Appl. No.: 13/763,771

(22) Filed: Feb. 11, 2013

(65) Prior Publication Data

US 2013/0154234 A1      Jun. 20, 2013

Related U.S. Application Data

(63) Continuation-in-part of application No. PCT/IB2011/001848, filed on Aug. 11, 2011.

(60) Provisional application No. 61/372,997, filed on Aug. 12, 2010.

(51) Int. Cl.
    | | |
    |---|---|
    | *B62K 21/18* | (2006.01) |
    | *B62K 21/02* | (2006.01) |
    | *B62J 99/00* | (2009.01) |
    | *B62K 19/30* | (2006.01) |
    | *B62K 21/12* | (2006.01) |

(52) U.S. Cl.
    CPC ............... *B62K 21/02* (2013.01); *B62J 99/00* (2013.01); *B62K 19/30* (2013.01); *B62K 21/12* (2013.01); *B62J 2099/0046* (2013.01); *B62J 2300/0046* (2013.01); *B62K 21/18* (2013.01); *Y10T 29/49826* (2015.01)

(58) Field of Classification Search
    CPC ................................ B62K 21/02; B62K 21/12
    USPC ............... 280/279, 274, 276, 281.1; 74/551.1
    See application file for complete search history.

(56) References Cited

U.S. PATENT DOCUMENTS

| | | | |
|---|---|---|---|
| 5,163,697 A | 11/1992 | Kastan | |
| 5,979,925 A | 11/1999 | Lin | |
| 6,220,398 B1 * | 4/2001 | Wu | 188/24.11 |
| 6,983,949 B2 * | 1/2006 | Ueno et al. | 280/279 |
| 7,000,936 B2 | 2/2006 | Schmider | |
| 7,114,738 B1 * | 10/2006 | Chen | 280/281.1 |
| 7,396,032 B2 * | 7/2008 | Horiuchi | 280/279 |
| 7,562,889 B2 * | 7/2009 | Cauwet | 280/276 |

(Continued)

FOREIGN PATENT DOCUMENTS

| | | |
|---|---|---|
| EP | 1598263 A2 | 11/2005 |
| EP | 1787899 A1 | 5/2007 |

(Continued)

*Primary Examiner* — Kevin Hurley
*Assistant Examiner* — Michael Stabley
(74) *Attorney, Agent, or Firm* — King & Schickli, PLLC

(57) ABSTRACT

The present invention relates to a bicycle in which at least a portion of a control cable is routed internally. In particular, a bicycle according to the invention comprises a frame, the frame including a head tube; a fork assembly carried by the frame; and a cable guide positioned at least partially within the head tube and connected to the fork assembly, the cable guide adapted for receiving the portion of the control cable. The invention extends to a method of routing the control cables through a bicycle frame to minimize aerodynamic losses that are caused by control cables. More particularly, the method includes the steps of providing a bicycle frame comprising a head tube, providing a fork steerer including a groove formed in the fork steerer at least partially within the head tube, and positioning a portion of the cable within the groove.

12 Claims, 20 Drawing Sheets

(56) References Cited

U.S. PATENT DOCUMENTS

| | | |
|---|---|---|
| 7,566,065 B2 * | 7/2009 | Fukui .................. 280/281.1 |
| 7,891,687 B2 | 2/2011 | Schmider |
| 2004/0188976 A1 | 9/2004 | Schmider |
| 2006/0145446 A1 | 7/2006 | Schmider |
| 2007/0108723 A1 * | 5/2007 | Fukui .................. 280/276 |

FOREIGN PATENT DOCUMENTS

| | | |
|---|---|---|
| WO | 2008065677 A2 | 6/2008 |
| WO | 2009146551 A1 | 12/2009 |

* cited by examiner

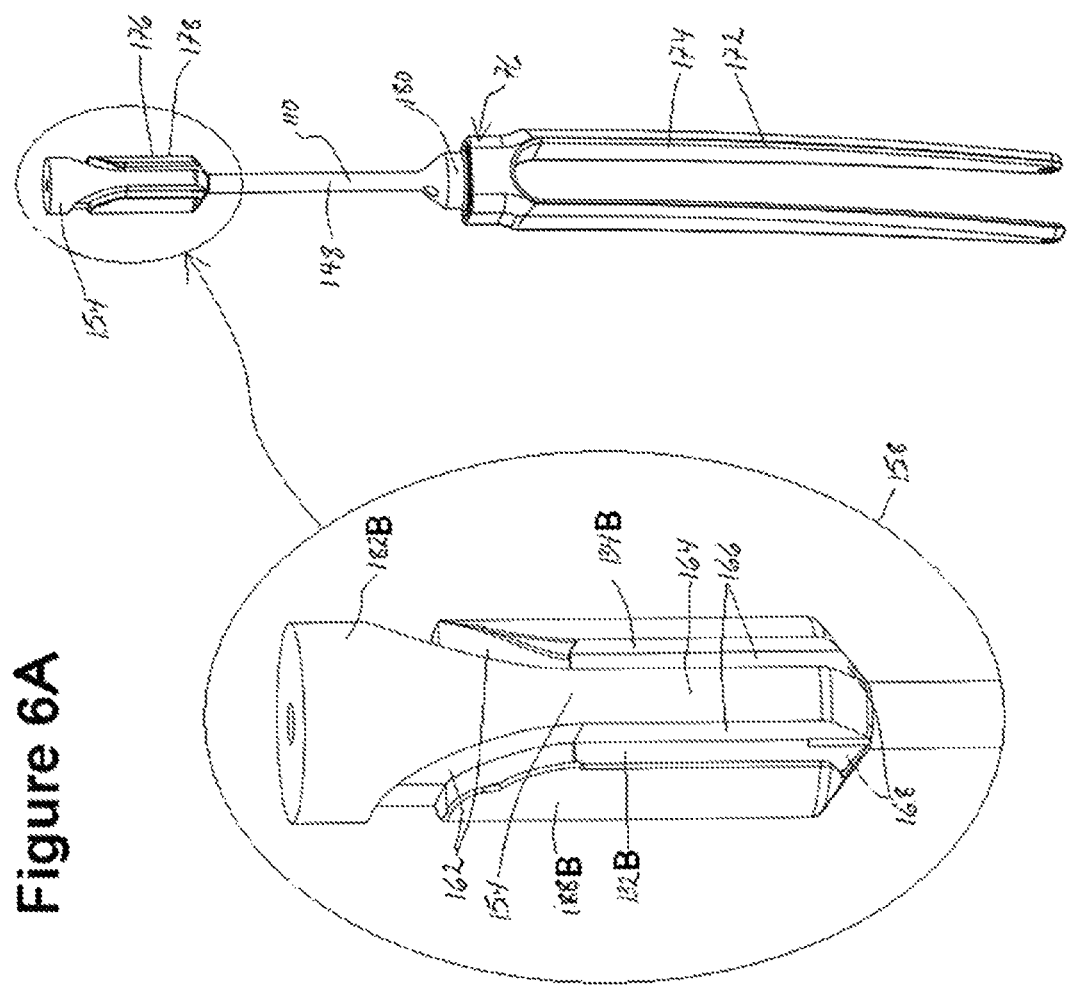

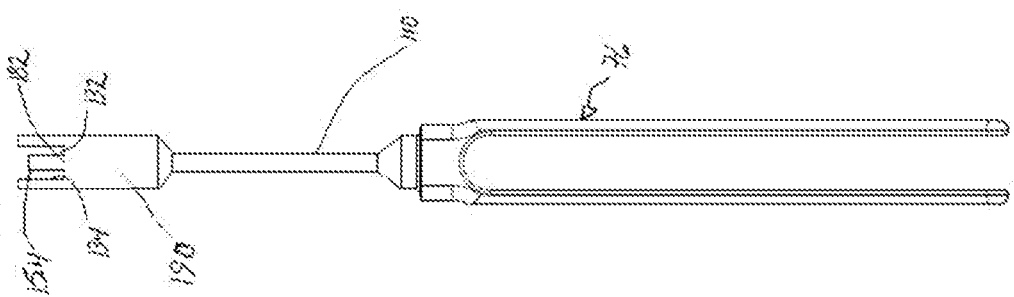

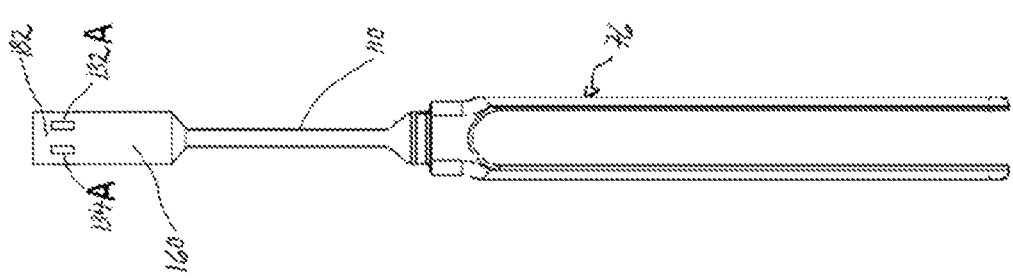

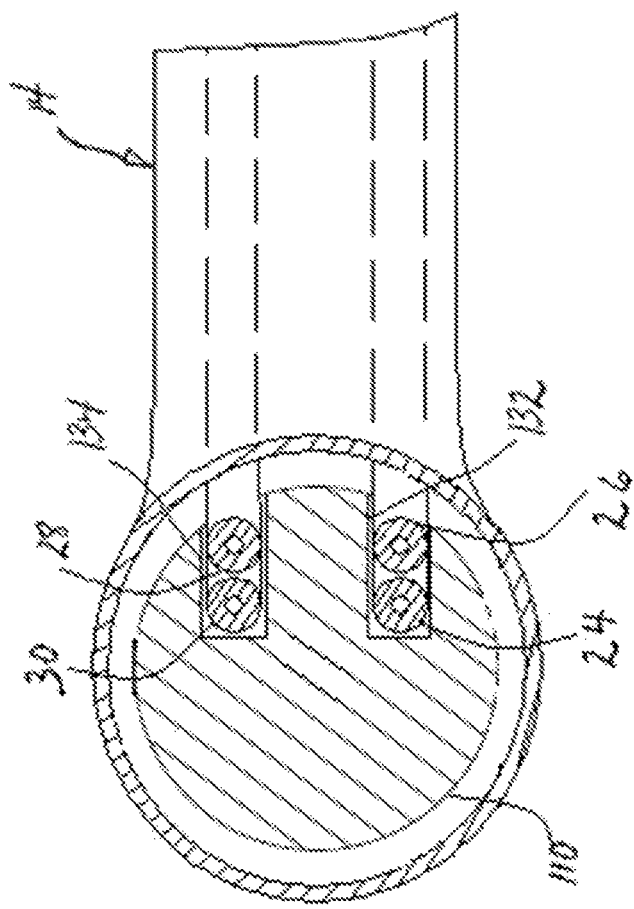

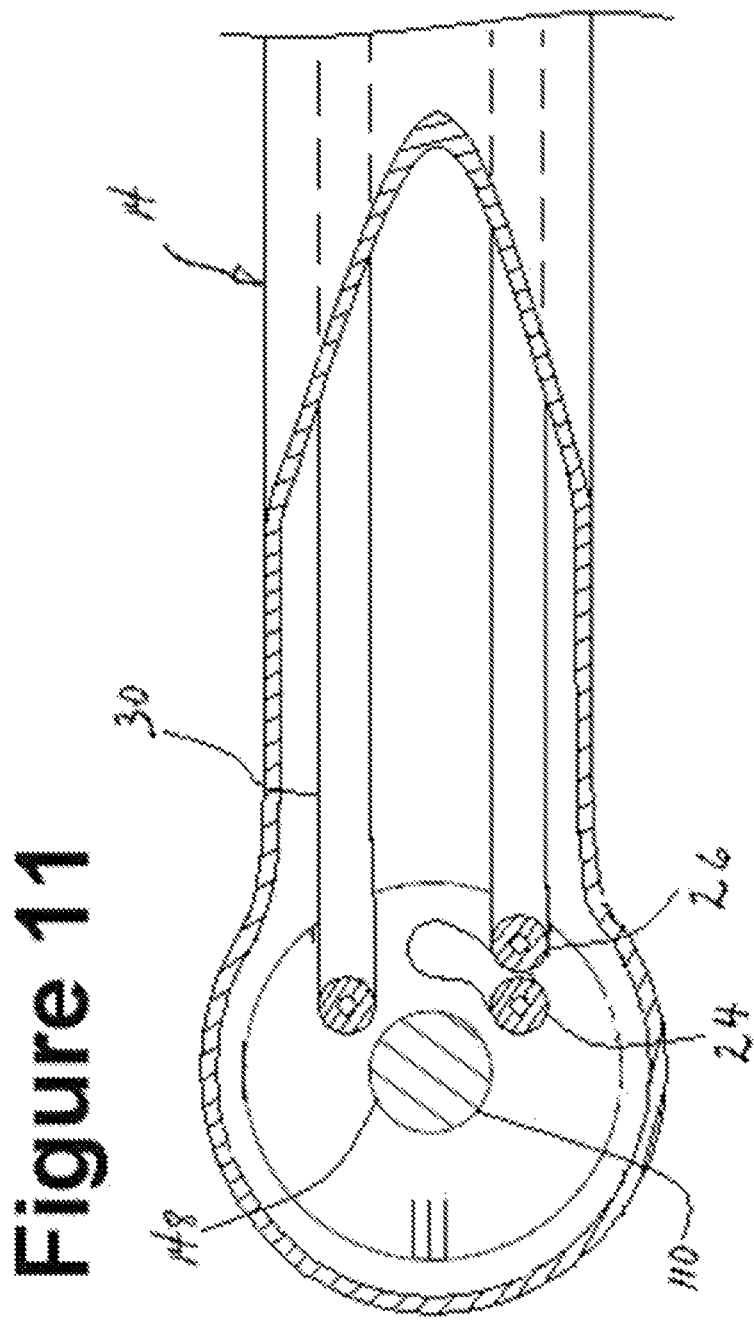

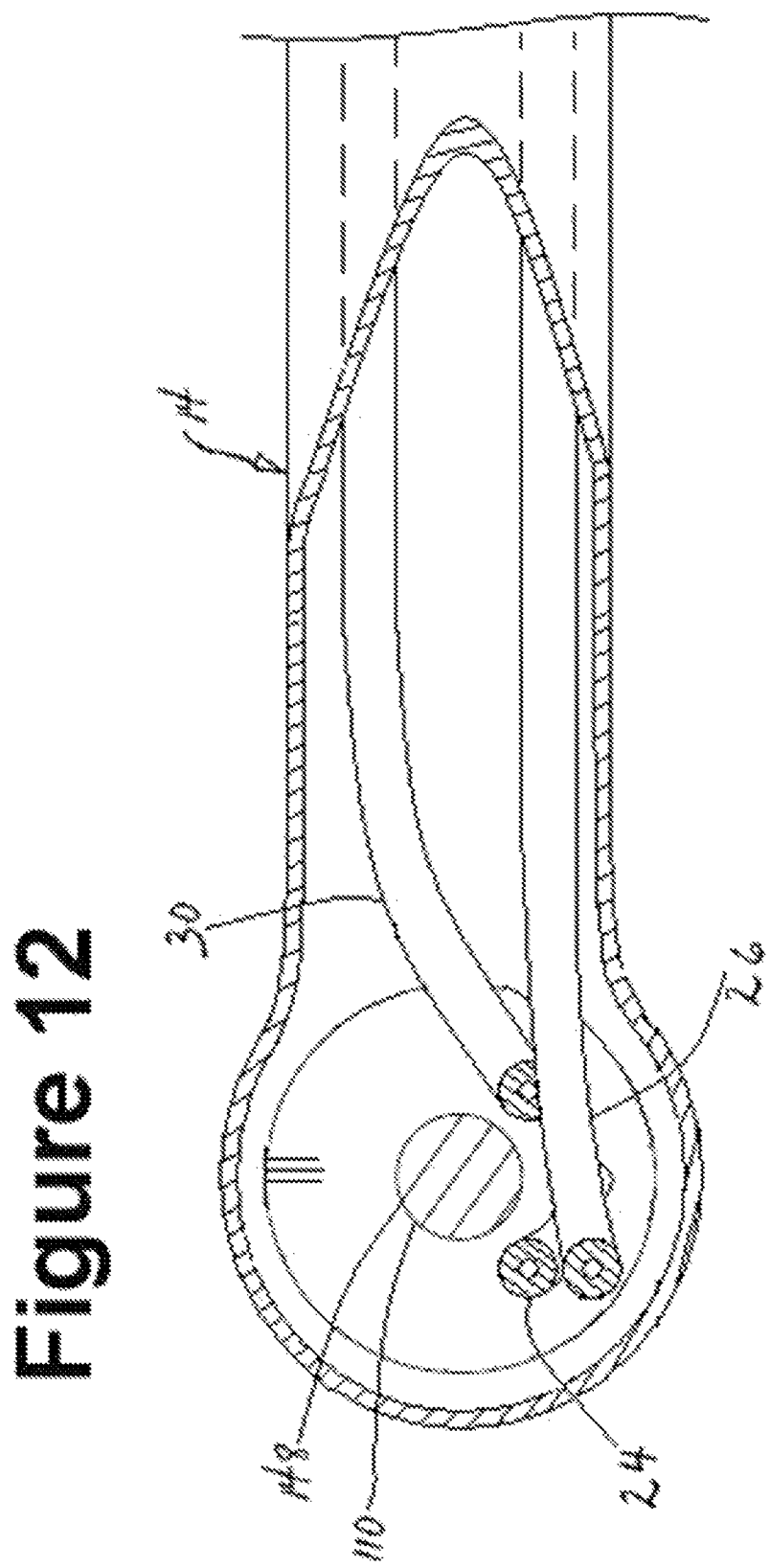

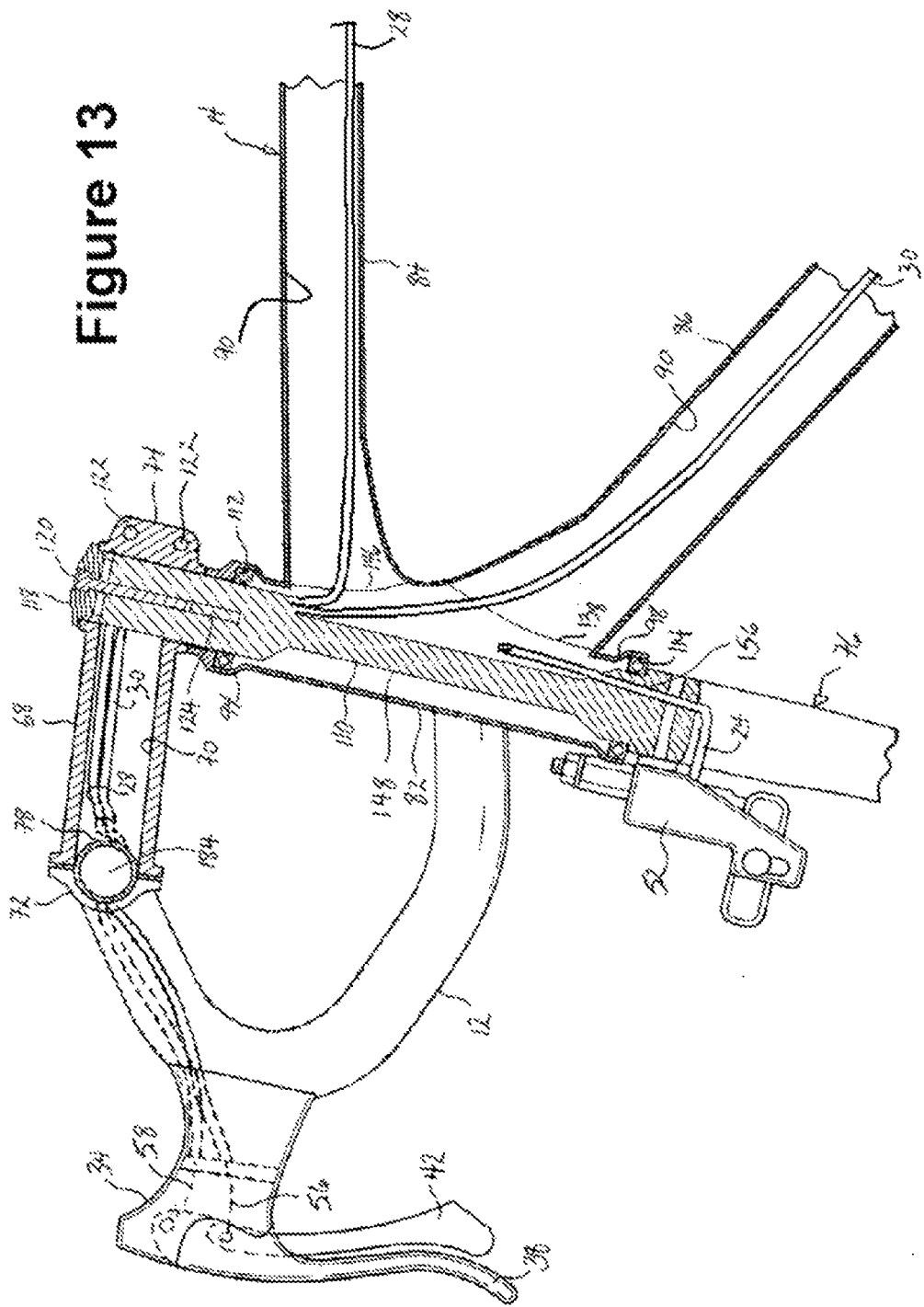

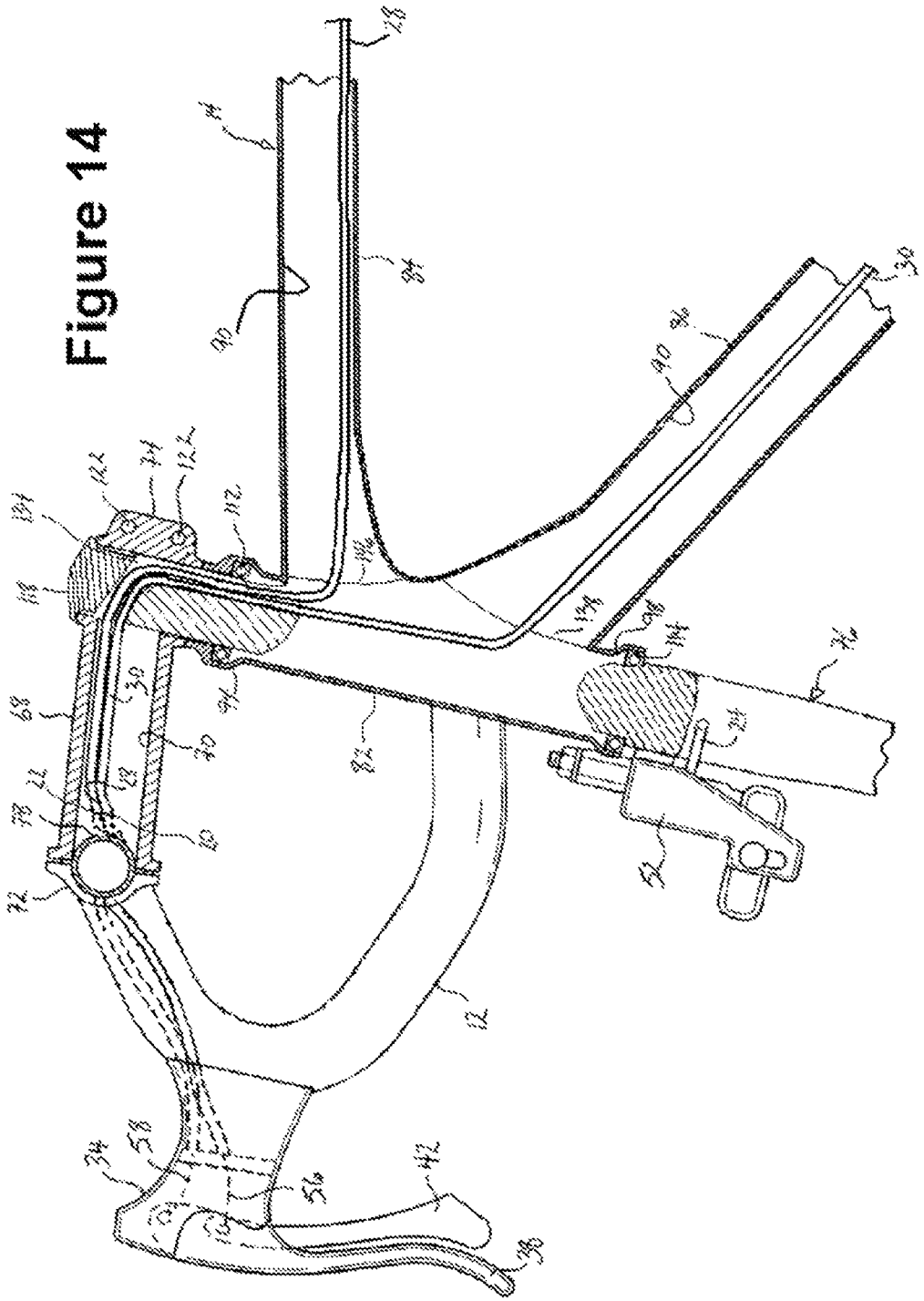

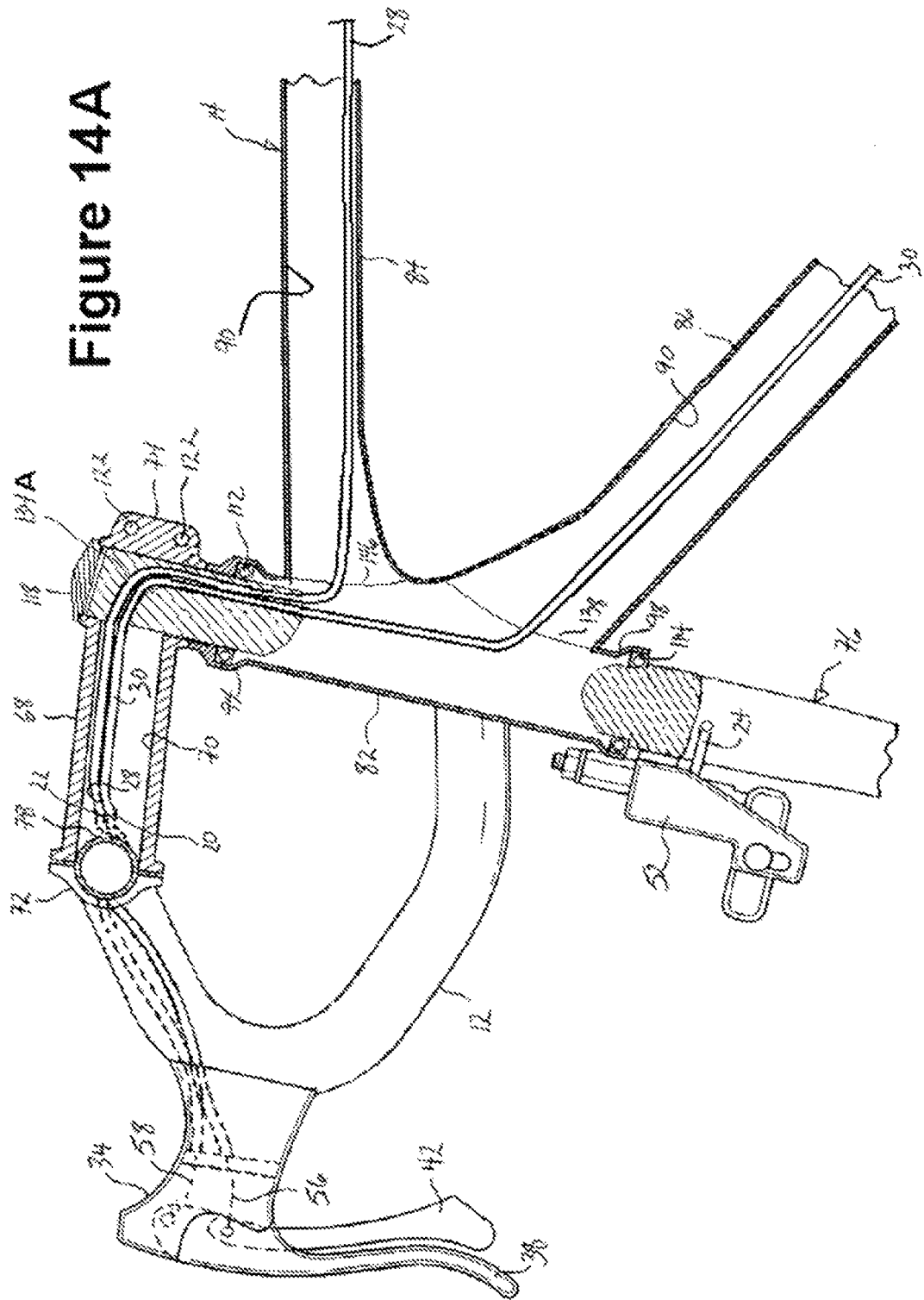

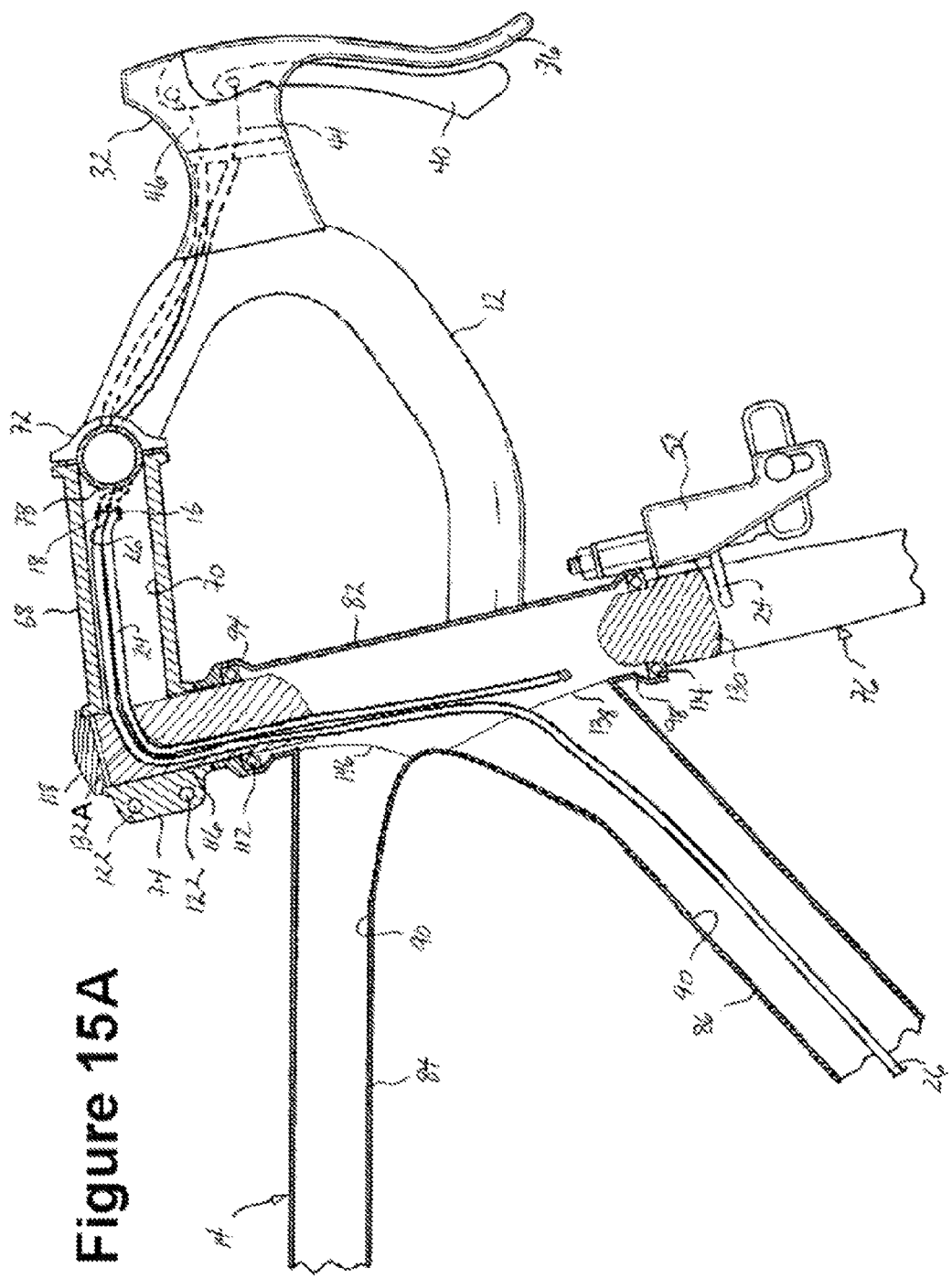

APPARATUS AND METHOD FOR ROUTING BICYCLE CONTROL CABLES

This application is a continuation-in-part of international application Ser. No. PCT/IB2011/001848, and claims the benefit of U.S. provisional patent application Ser. No. 61/372,997, the disclosures of which are incorporated herein by reference.

FIELD OF THE INVENTION

The present invention relates to a bicycle in which control cables for the bicycle are routed through the interior of the frame tube members. The invention extends to a method of routing the control cables through a bicycle to minimize aerodynamic losses that are caused by control cables.

BACKGROUND TO THE INVENTION

In recent decades, bicycle designers have been focusing more and more on the aerodynamic characteristics of bicycles in order to make them faster whilst allowing a cyclist to exert the same amount of effort. Bicycle components, such as frames, wheels and handlebars, to name but a few, have been improving from an aerodynamic point of view at a rapid pace. In more recent years companies have started also to redesign the way bicycle control cables are routed from the control levers to the controlled components.

Control cables are used to control, inter alia, front and back wheel braking mechanisms and front and back shifting mechanisms, such as the front and rear derailleurs. These control cables were conventionally routed directly from the shifters and brakes along the externals of the handlebar, frame and other components without entering the frame or handlebar. However, positioning of these cables outside of the frames has proven troublesome as the cables are exposed to possible damaging conditions. Also, outside mounting of the cables along the tubular frame members sometimes covers art work or graphics on the bicycle frame, thus adversely affecting aesthetic appeal characteristics. Moreover, a bicycle's cables can be held responsible for as much as 3-4% of a bicycle's total aerodynamic losses and such outside mounting of the control cables has a huge adverse effect on a bicycle's aerodynamic performance.

The most aerodynamic method to route a bicycle cable on a bicycle is to do so internally from the control lever to the controlled components. Various attempts have been made in the past to thread or house control cables through bicycle frames. However, such prior art attempts often did not provide for adequate leeway for fluid drainage through the tubes, allowing moisture to enter the tube interior through the openings provided for the cables, thus causing corrosion problems.

One prior art method of routing bicycle cables comprises routing the cables into the bicycle frame on the top and down tube. This system routes the cables along the external of the handlebars and then into the frame via holes in the top tube and down tube of the bicycle. Aerodynamics of this routing method are better than a full external cable routing system, however aerodynamic losses are still evident.

Another prior art method provides routing the cables behind the stem. In particular, the cables are routed along the external handlebars and then into the frame behind the stem. It is currently the most aerodynamically efficient cable routing system, however it still allows for aerodynamic losses from cables being exposed to the wind between the handlebars and frame entry points.

It should be noted that in the above prior art examples the control cables are routed along the handlebar under handlebar tape. The control cables are thus still considered internal for this application until the point where the cable exits from the handlebar tape.

US Patent 2006/0145446 A1 employs a method whereby a hollow steerer tube is used to guide the cables, the steerer tube having two slots at the top end (one at the front and one at the rear) and a flat face on the rear side. This configuration requires a shim in order to stiffen the interface between the fork steerer tube and the upper headset bearing assembly. This system is not as stiff and rigid as a single piece steerer tube. Assembly of the fork and stem is also complex when compared to a single piece steerer tube and this will increase assembly time and cost during service.

Furthermore, the angle through which the handlebar is able to be turned before the cables hinder further rotation is limited when compared to current systems on the market. Such limitation can cause damage to the cables, steerer tube or frame in the event of an accident whereby cables are pinched between the steerer tube and frame. This could result in a failure leading to injury or death if not noticed after such an accident and, since the cables are hidden, such damage may go unnoticed. Such limitation also reduces transport possibilities, such as when handle bars need to be turned rearward when the front wheel is removed and the bicycle is transported between front and rear motor vehicle seats.

The relatively thin walled steerer tube could also cause damage to the cables due to rubbing over the slots of US Patent 2006/0145446 A1.

The hole in the center rear section of the handlebar causes the strength and stiffness to be reduced. As it is in a critical section of the handlebar where stresses are at near maximum levels, it is not an ideal way to route cables into the stem.

US Patent 006983949 B2 makes use of a tubular spacer member with an axial hole for routing in order to route wiring through the upper headset bearing. This method can also be employed to route control cables through the upper headset bearing. However, due to the tight spatial constraints between the outer wall of a conventional steerer tube and the inner wall of the frame's head tube there would in most cases not be sufficient space for such a routing of the control cables. This is especially true for frames that are designed to narrow between the upper and lower headset bearings in order to reduce the frontal area and thus improve the aerodynamic performance of the bicycle. Current Cervelo™ S and P series frames are a good example of this type of narrowing of the head tube.

Furthermore this method requires additional parts and more complex assembly procedures when compared to standard systems.

SUMMARY OF THE INVENTION

According to the invention there is provided a bicycle having at least a portion of a control cable internally routed, the bicycle comprising
  a frame including a head tube;
  a fork carried by the frame; and
  a cable guide positioned at least partially within the head tube and connected to the fork, the cable guide including at least one groove dimensioned for receiving the portion of the control cable.

The bicycle may include a plurality of control cables for controlling braking and gear shifting of the bicycle. To this end, the cable guide may comprise a pair of spaced grooves, each for receiving a portion of one of the control cables. The grooves may be elongated in an axial direction.

The grooves may be provided in a head end of the cable guide. The head end may comprise an upper end, including a first portion of the grooves, and a rear end comprising a second portion of the grooves. The cable guide may be positioned in the head tube in such a manner that a lower end of at least one of the grooves aligns with a hollow passageway within the frame.

The bicycle further may include a stem cap including at least one protrusion adapted to protrude into the at least one groove of the cable guide. In a preferred embodiment the stem cap includes two protrusions that are adapted to protrude into the two grooves.

The bicycle also may include a stem supported by the fork, wherein the stem has an internal passageway for receiving a second portion of the control cable different from the first portion. The stem also may include cable apertures on the stem side walls for routing cables into the stem from the handlebar.

According to a second aspect of the invention there is provided an apparatus for use in a bicycle including at least one control cable, the apparatus comprising a fork assembly including a fork steerer having at least one groove adapted for receiving a portion of the at least one control cable.

The apparatus may include plural control cables. The fork assembly may include a fork having a bifurcated lower end for receiving at least a portion of the front wheel of the bicycle. The fork steerer may include a split configuration at its upper end. In one embodiment of the invention the fork steerer may include a bifurcated upper end. In a preferred embodiment the fork steerer may include a trifurcated upper end, including a pair of grooves, each groove being adapted for receiving a portion of one of the plural control cables.

According to a third aspect of the invention there is provided a fork assembly adapted for routing at least one control cable of a bicycle, the fork assembly including a fork steerer comprising an upper end including a solid or partially solid rod and a fork having a lower, bifurcated end adapted for receiving a portion of the front wheel of the bicycle.

The solid or partially solid rod may include at least one elongated groove, preferably aligned with an axial dimension about which the fork steerer rotates in use.

The invention further provides a method of arranging a control cable internal to a bicycle frame, comprising the step of positioning a portion of the cable within a groove formed in a fork steerer. More particularly, the bicycle frame may include a head tube and the method may comprise the step of providing the fork steerer, including the groove, at least partially within the head tube.

The bicycle may include a handlebar, and the method may include routing the control cable through the handlebar and directly into the stem as would be possible with a one piece, integrated handlebar and stem.

Alternatively, the handlebar may be wrapped in handlebar tape, and the method may include routing at least one control cable externally along the handlebar underneath the handlebar tape. The method may include routing the control cable between the handlebar tape and the cable apertures on the stem side walls.

The invention further extends to a method of manufacturing a fork steerer for a bicycle including at least one control cable, comprising the step of providing at least one groove in the fork steerer, the groove being adapted for receiving a portion of the control cable.

According to a further aspect of the invention there is provided a bicycle having at least a portion of a control cable internally routed, the bicycle comprising
 a frame, including upper and lower bearing assemblies;
 a fork assembly rotatably supported by the upper and lower bearing assemblies of the frame, the fork assembly including a fork steerer having an upper end for positioning adjacent the upper bearing assembly, a lower end positioned adjacent the lower bearing assembly, and an intermediate portion between the upper and lower ends having a reduced cross-sectional area relative to at least the upper end.

DESCRIPTION OF FIGURES

FIG. 6a is a perspective view of an alternate embodiment of the fork with solid fork steerer of variable cross section.
FIG. 7 is a view of the fork as seen from direction F in FIG. 4.
FIG. 7a illustrates an alternate embodiment of the fork.
FIG. 10 is a sectional view of the fork in the straight ahead position.
FIG. 11 is a sectional view of the fork in the straight ahead position.
FIG. 12 is a sectional view of the fork rotated away from the straight ahead position.
FIG. 13 is a cross sectional view of the handlebar, stem and fork assembly of the bicycle showing the routing of cables through the center of the bicycle.
FIG. 14 is a cross sectional view of the handlebar, stem and fork assembly of the bicycle showing the routing of cables through the left side slot.
FIG. 14a is a cross sectional view of an alternate embodiment of the handlebar, stem and fork assembly of the bicycle showing the routing of cables.
FIG. 15a is a cross-sectional view of an alternate embodiment of the handlebar, stem and fork assembly of a bicycle, which includes internal passageways.

DETAILED DESCRIPTION OF A PREFERRED EMBODIMENT

Figure 1:
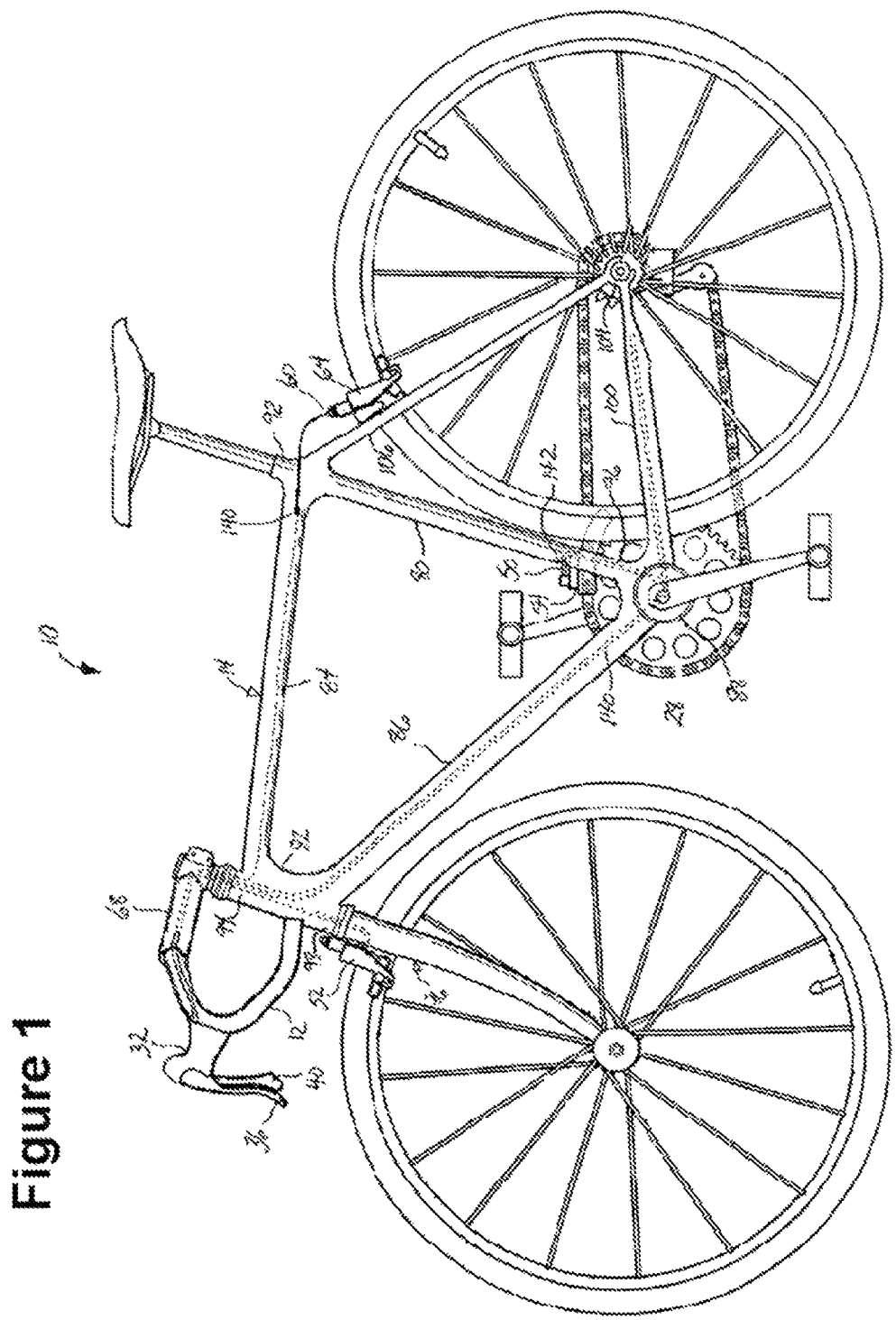
FIG. 1 is a side view of a bicycle according to a preferred embodiment of the invention.
Figure 2:
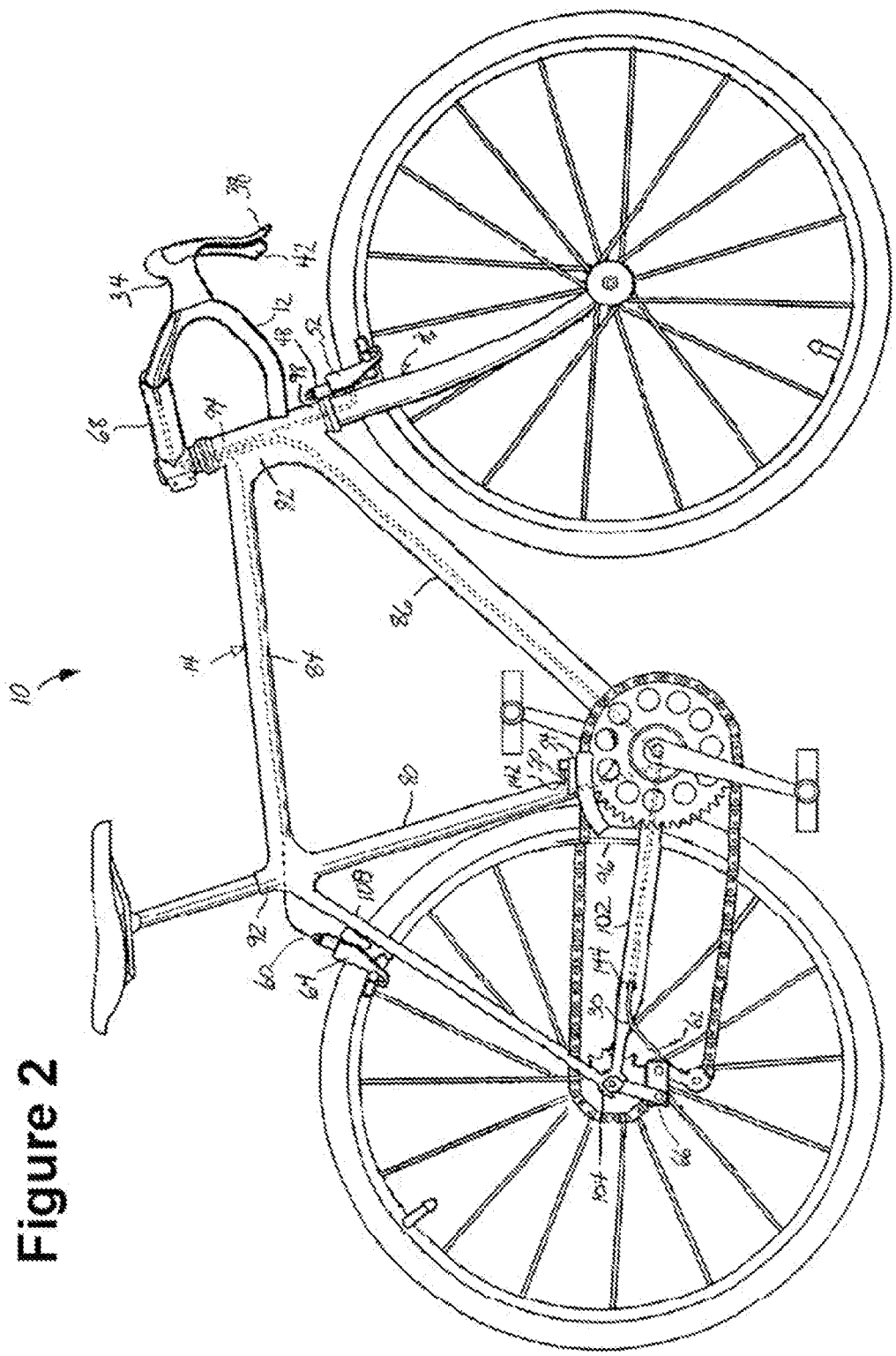
FIG. 2 is an opposing side view of the bicycle.
Figure 3:
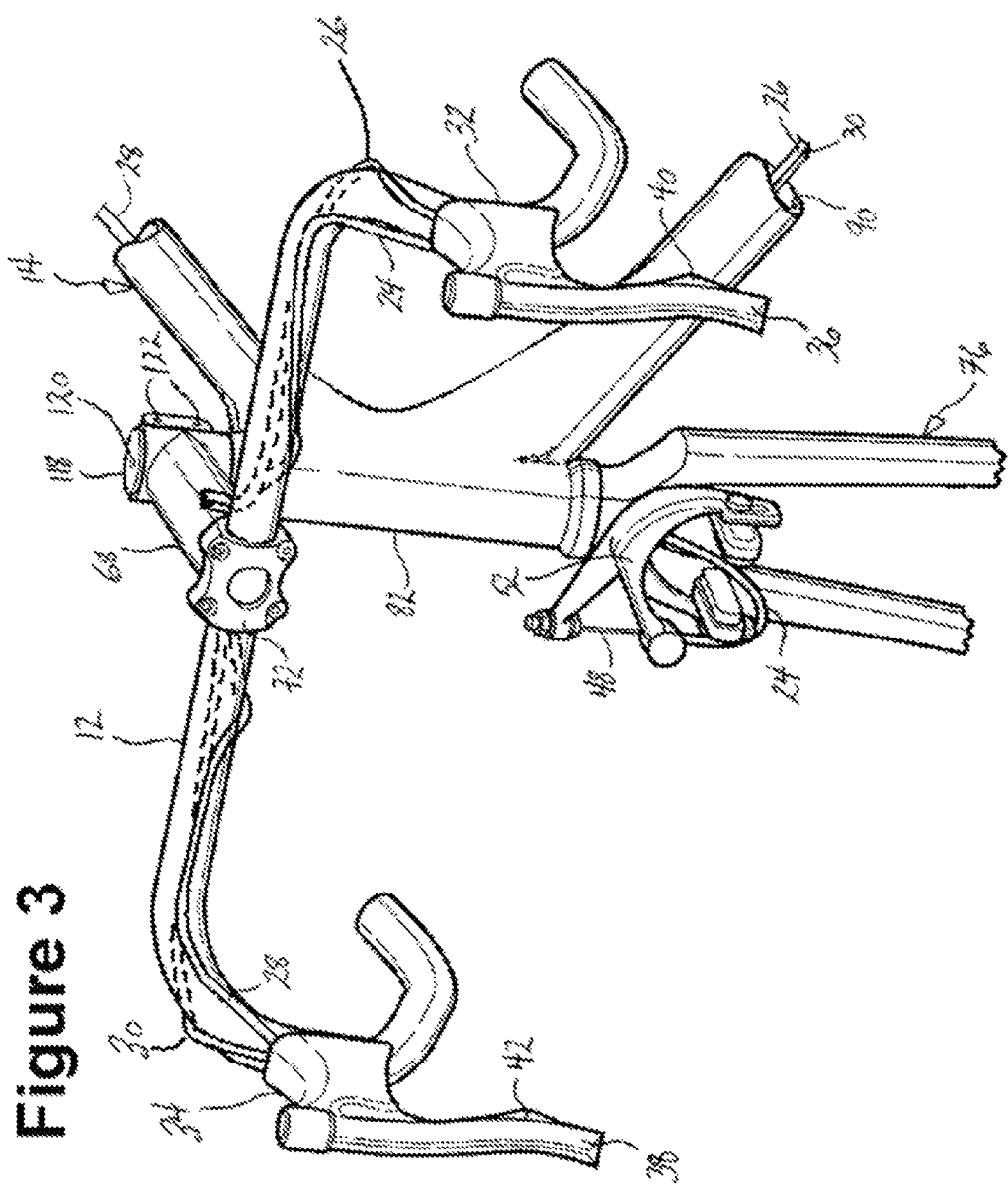
FIG. 3 is a perspective view of a handlebar, stem and fork assembly of the bicycle.

Referring to FIG. 1 and FIG. 2, a preferred embodiment of the invention includes a bicycle, generally shown at 10, having a handlebar 12 operatively coupled to a tubular frame, generally indicated at 14. Referring to FIG. 3, one or more control cables 24, 26, 28, 30 originating at the control levers 32, 34, which are operatively mounted to the handlebar 12 and are routed from the control levers 32, 34 along the outside of the handlebar 12. Handlebar tape, grips or a cover can be used to conceal them. The control cables 24, 26, 28, may be, for example, a push-pull Bowden-type cable assembly.

Referring to FIGS. 1, 2, 3, 13 and 15, each of the control levers 32, 34 operatively mounted to the handlebar 12 may include a brake lever 36, 38 and a shift lever 40, 42. The front brake cable 24 and the front derailleur cable 26 extend between first ends 44, 46, fixedly secured to the brake and shift levers 36, 40, and second ends 48, 50, adapted to be secured to a front brake 52 and front derailleur 54 respectively. The front brake and derailleur cables 24, 26 control the front brake 52 and front derailleur 54 respectively when the front brake and shift levers 36, 40 are actuated. The rear brake cable 28 and the rear derailleur cable 30 extend between first ends 56, 58, fixedly secured to the brake and shift levers 38, 42, and second ends 60, 62, adapted to be secured to a rear brake 64 and rear derailleur 66 respectively. The rear brake and derailleur cables 28, 30 control the rear brake 64 and rear derailleur 66 respectively when the rear brake and shift levers 38, 42 are actuated. Additional control cables, levers, electric wires or alternate systems and control lever configurations could be included without changing the fundamental spirit or scope of the invention.

Figure 15:
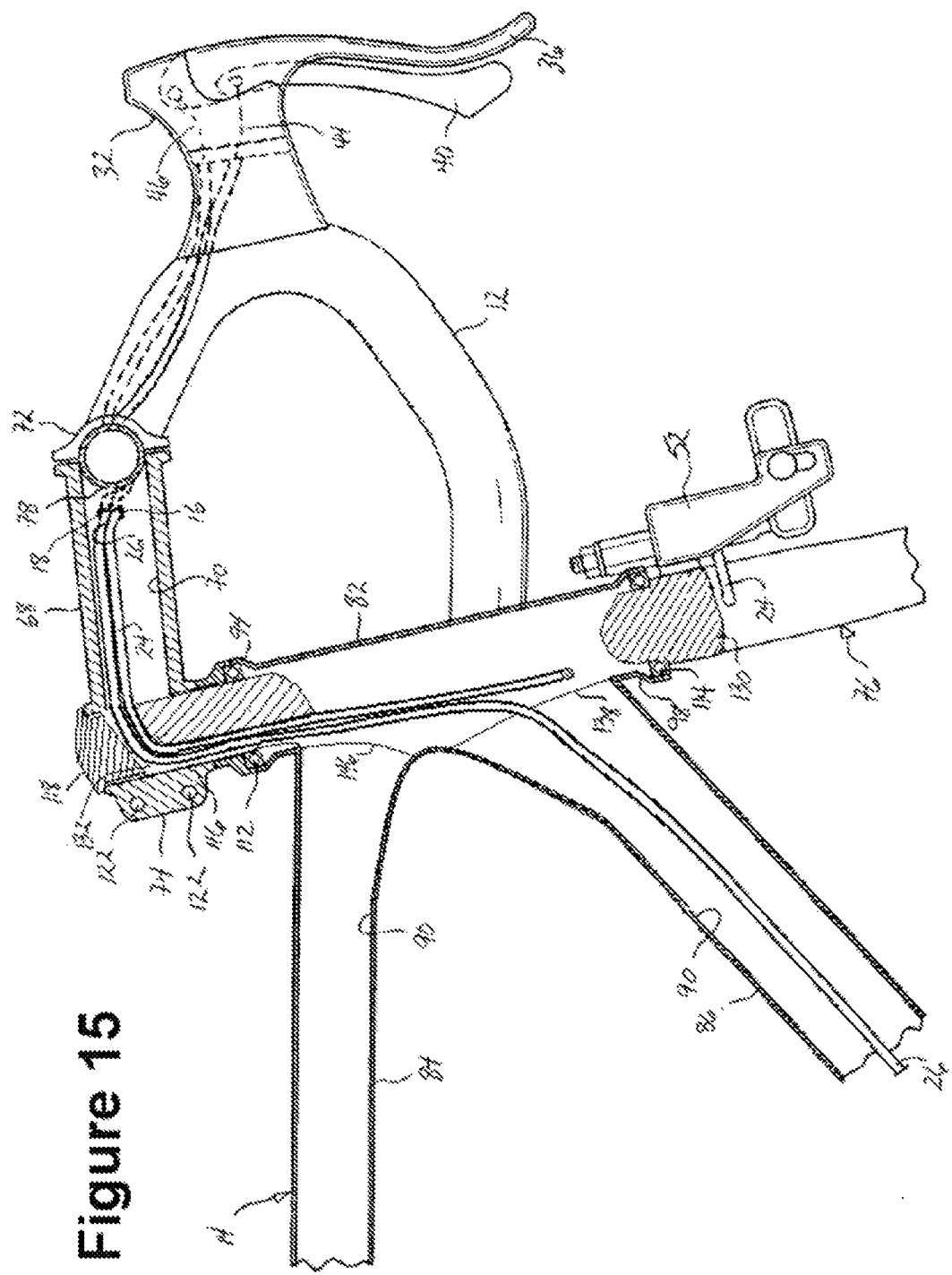
FIG. 15 is a cross sectional view of the handlebar, stem and fork assembly of a bicycle showing the routing of cables through the right side slot.

Referring to FIGS. 3, 13, 14 and 15, a stem 68 for securing the handlebar 12 to the frame 14 of the bicycle 10 includes an axial bore 70 therethrough. The stem 68 also includes apertures 16, 18, 20, 22 for receiving control cables 24, 26, 28, 30. The stem extends between a first end 72 fixedly secured to the handlebar 12 and a second end 74 fixedly secured to a fork, generally indicated at 76, which is rotatably coupled to the frame 14. The control cables 24, 26, 28, 30 enter the stem 68 via the apertures 16, 18, 20, 22, as shown in FIGS. 4, 14, 15 and are routed internally along the axial bore 70 of the stem 68.

Referring to FIGS. 1, 2 and 13 the tubular frame 14 of the bicycle 10 includes a seat tube 80, head tube 82, top tube 84, down tube 86 and a bottom bracket 88 interconnected to define hollow passageways 90 therethrough. The top tube 84 extends between upper ends 92, 94 of the seat tube 80 and head tube 82. The down tube 86 extends between the lower ends 96, 98 of the seat tube 80 and head tube 82. A pair of chain stays 100, 102 extends from the bottom bracket 88 to a rear drop out 104. A pair of seat stays 106, 108 extends from the upper end 92 of the seat tube 80 to the rear drop-out 104. In the preferred embodiment, tubes form a one piece structure of carbon fiber; however tubes can be joined using any suitable joining process such as welding, gluing or press fitting.

Figure 6:
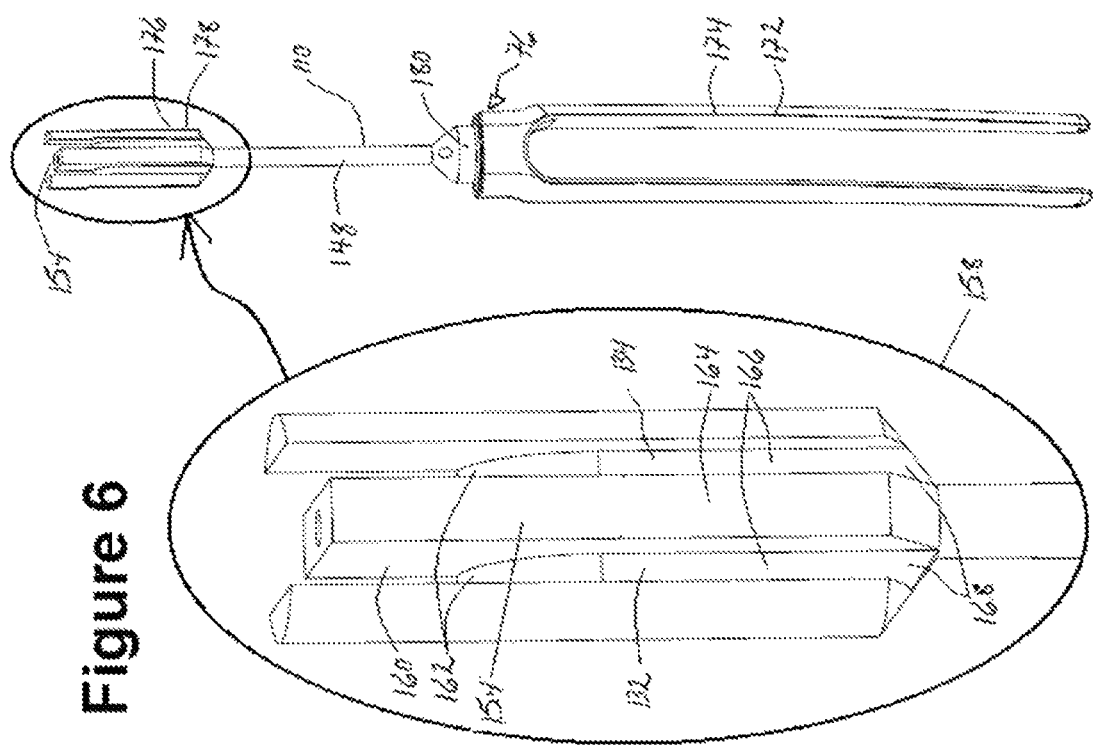
FIG. 6 is a perspective view of the fork with solid fork steerer of variable cross section.
Figure 8:
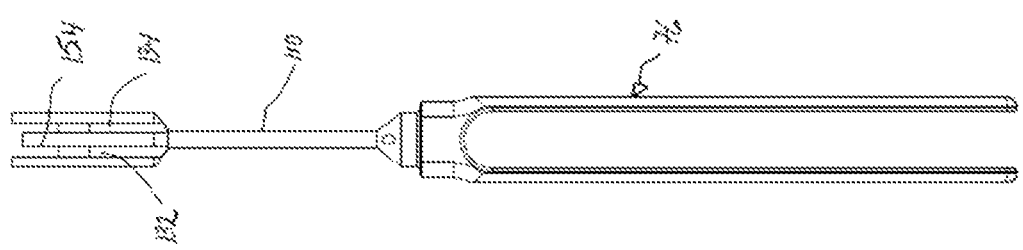
FIG. 8 is an opposing view of the fork as seen in the opposite direction to F in FIG. 4.
Figure 9:
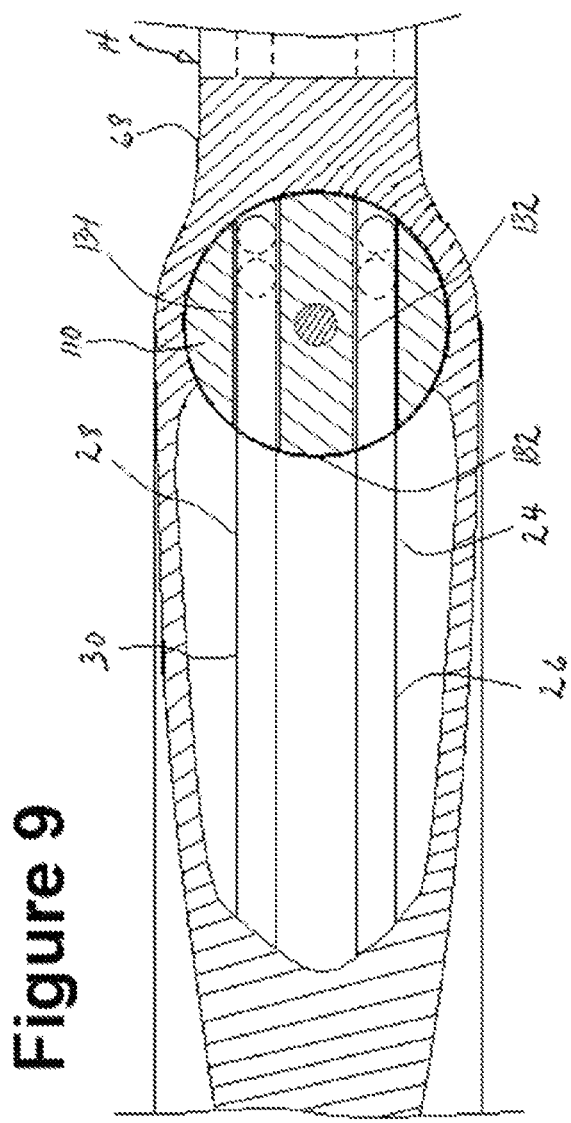
FIG. 9 is a sectional view of the fork in the straight ahead position.

Referring to FIGS. 6 and 13, the bicycle 10 is provided with a cable guide for internally guiding at least one of the control cables. In one embodiment, this cable guide comprises a fork assembly 76 including a fork steerer 110 extending at one end through the head tube 82 of the frame 14 and connected to the fork assembly 76 at the other (which as should be appreciated includes a bifurcated lower end adapted for receiving a portion of the front wheel of the bicycle 10). Upper and lower bearing assemblies 112, 114 (which may comprise headset bearings) are disposed in the upper and lower ends 94, 98 of the head tube 82 respectively. The stem 68 is fixedly secured to the fork steerer 110 via a standard pinch bolt clamping arrangement. Alternate methods of fixing the stem 68 and handle bar 12 to the fork 76 could be included without changing the fundamental spirit or scope of the invention. An example of an alternate arrangement would be an offset fork whereby the stem is not attached directly to the steerer, but in fact to another tube on the leading edge of the fork such as with current Felt™ and Trek™ time trial frames and fork designs.

Figure 4:
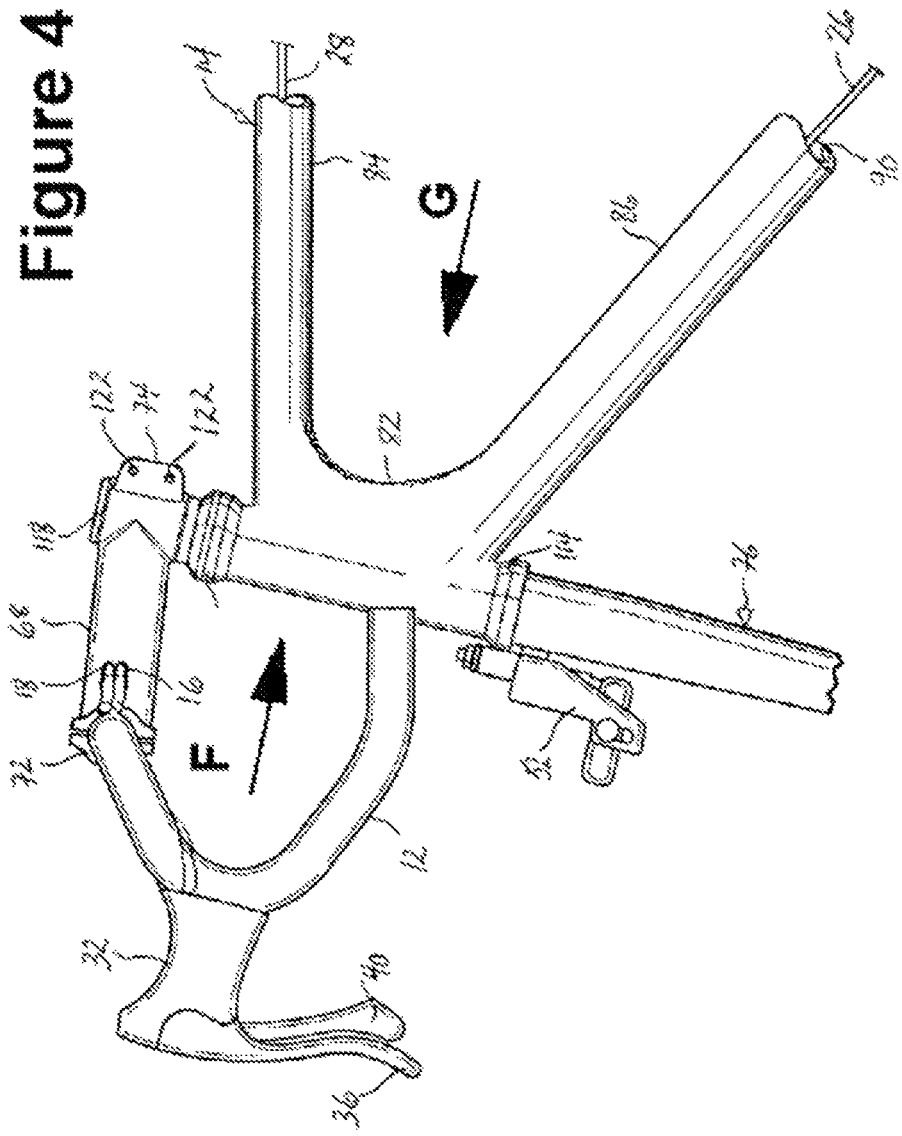
FIG. 4 is a side view of the handlebar, stem and fork assembly.
Figure 5:
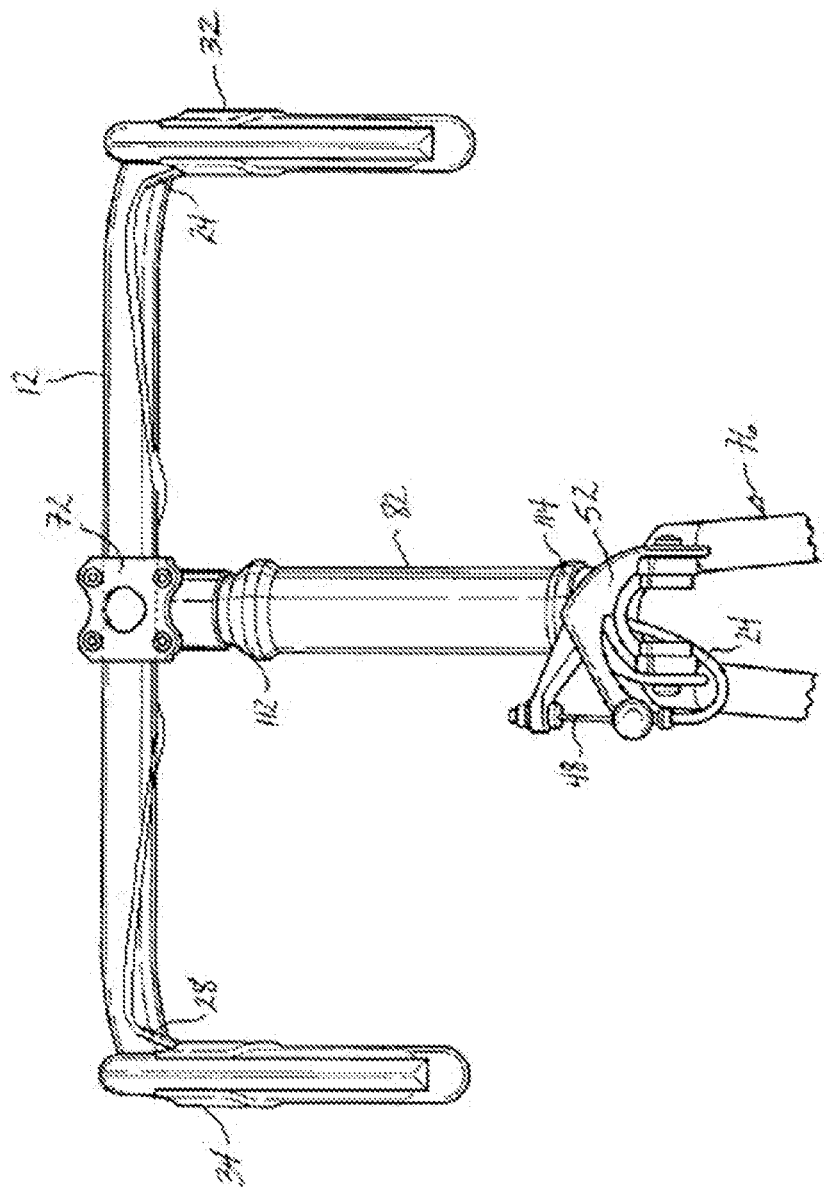
FIG. 5 is a front view of the handlebar, stem and fork assembly.

Referring to FIGS. 3, 4 and 13, the stem 68 also includes a stem cap 118 having a tension bolt 120 for preloading of the bearings in the upper and lower bearing assemblies 112, 114. Preloading of the bearings is achieved by loosening stem clamping bolts 122 and adjusting the tension bolt 120 of the stem cap 118, which is attached to the fork steerer 110 by means of a threaded hole 124. Once the desired level of preload is achieved, the stem clamping bolts 122 are tightened, as required.

Referring to FIGS. 6, 7, 8, 9, 10, 11, 12, 13, 14, 15, 16, the fork steerer 110 comprises a solid or partially solid rod 178 of varying cross sectional area. The cross section from the top of the fork steerer 110 to below the upper bearing assembly 112 has a generally circular outer profile as in FIGS. 9 and 10, with sufficient diameter to secure to the upper bearing assembly 112 and to allow securing of the stem 68. The cross section 148 between the upper and lower bearing assemblies 112, 114 is reduced as in FIG. 13. Grooves 132, 134 run from the top front 182 of the fork steerer 110 (thus providing a trifurcated, upper end in this illustrated embodiment), around the tension bolt threaded hole 124 and tension bolt 120 and down the back of the fork steerer 110 to below the upper bearing assembly 112 in the region of the reduced section 148 of the fork steerer 110. The cross section from below the lower bearing assembly to the bottom of reduced section 148 of the fork steerer 110 has a generally circular outer profile as seen in FIGS. 11 and 12. The control cables 24, 26, 28, 30 enter the grooves 132, 134 of the fork steerer 110 from the axial bore 70 of the stem 68 and are routed within these grooves and through the upper bearing assembly 112. The control cables 24, 26, 28, 30 then exit the fork steerer 110 below the lower ends of the grooves 168 and enter a hollow passageway 90 formed within members of the frame 14 of the bicycle 10. It is important to note that the control cables 24, 26, 28, 30 remain inside the fork steerer 110 until they have passed through the upper headset bearing 112. The reduced cross sectional area 148 of the fork steerer 110 between the upper and lower bearing assemblies 112, 114 allows the handlebar 12 to be rotated without interference between the fork steerer 110, head tube 82 and control cables 24, 26, 28, 30. Cross sectional profiles and groove configurations may be varied without detracting from the fundamental spirit or scope of the invention. The cross sectional profile of the reduced section 148 between the upper and lower bearing assemblies can be modified so as to ensure sufficient strength and stiffness of the fork steerer 110 in this section.

Referring to FIG. 6B, grooves may also take the route of grooves 132B, 134B whereby routing is from the front 190 of the fork steerer 110, around the sides 188B of the fork steerer 110 and to the rear 182B.

Referring to FIGS. 7A, 14A and 15A, the grooves may form internal passageways 132A, 134A which allow for the routing of the control cables 24, 26, 28, 30 from the top front 182 of the fork steerer 110, through the solid or partially solid upper end 176 and into the hollow passageway 90 of the frame 14.

Grooves 132, 134 may also be used in combination with internal passageways 132A, 134A to route the control cables 24, 26, 28, 30 into the head tube 82 an it should be clear to one skilled in the art that many routing options are possible without detracting from the fundamental spirit or scope of the invention.

Figure 16:
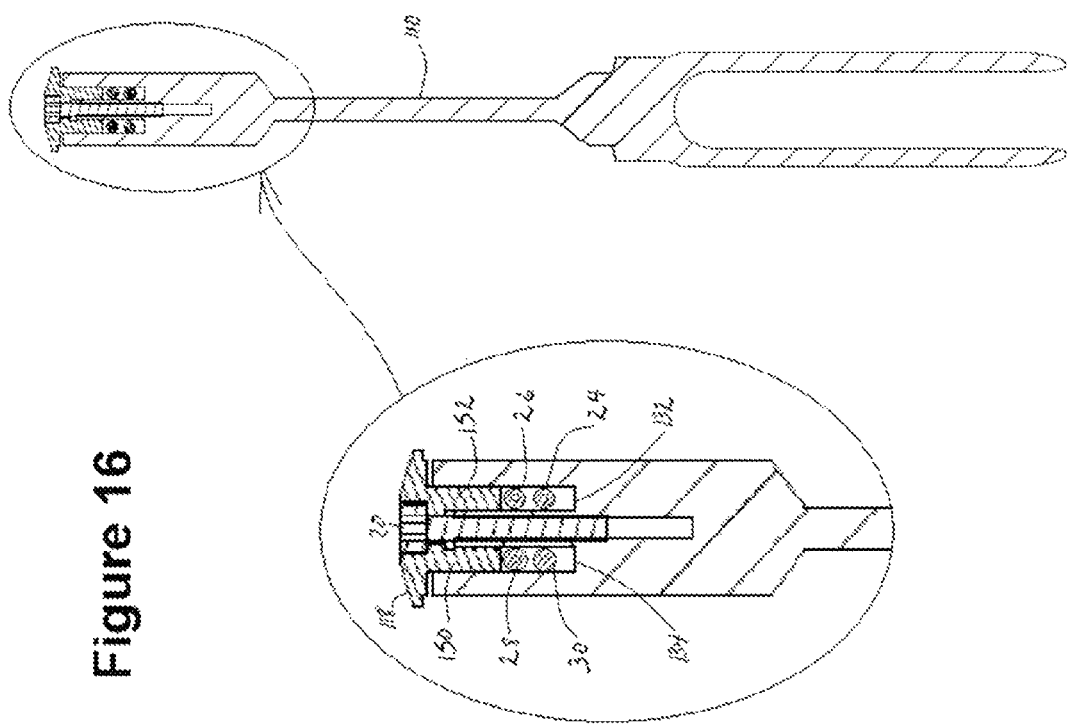
FIG. 16 is a cross sectional view of the fork, stem cap, tension bolt and control cables as seen from direction F in FIG. 4.

Referring to FIG. 16, the stem cap 118, includes protrusions 150, 152 on the lower side of the stem cap 118 that protrude into the grooves 132, 134 of the fork steerer 110, thus creating a tight fit when the stem clamp bolts 122 are tightened so as to reduce stress in the fork steerer 110 when the stem clamp bolts 122 are tightened. The geometry of the stem cap protrusions 150, 152 are such that there is sufficient space for the routing of the control cables 24, 26, 28, 30 through the grooves 132, 134 and through the upper bearing assembly 112. It should be obvious for one skilled in the art that variations of the top cap and routing of the cables into the fork steerer are possible without detracting from the fundamental spirit or scope of the invention. Many alternate ways of routing the control cables from the control levers and into the grooves exist. Examples of such methods include, routing the control cables from the control levers along the outside of the handlebar and stem and into the grooves 132, 134 via apertures in a stem cap, and routing the control cables inside an integrated handlebar and stem combination via apertures from adjacent the control levers 30, 32 through the internal passageway [70, 184] of the integrated handlebar and stem directly into the grooves 132, 134.

Referring to FIGS. 13, 14 and 15, the front brake cable 24 is routed from one of the grooves 132, 134 to a hole 156 in the lower part of fork steerer 110 where it then exits the fork 76 below the lower bearing assembly 114 to be secured to the front brake 52. Variations of how the cable passes through the lower bearing assembly can be included without detracting from the fundamental scope or spirit of the invention. Possible variations include integrated front brakes systems whereby the cable would not exit the fork, but be routed internally to be secured to the front brake housed inside the fork.

Referring to FIGS. 1, 13, 14 and 15, the rear brake cable 28 and the front and rear derailleur cables 26, 30 exit the grooves 132, 134 in the fork steerer 110 slightly below the upper bearing assembly 112 and enter the head tube 82 of the frame 14. The rear brake cable 28 is then routed into the frame via a passage 146, which communicates between the head tube 82 and the top tube 84. The rear brake cable 28 is routed inside the top tube 84 and exits the top tube 84 via an opening 140 to be secured to the rear brake 64 as shown in FIG. 1. The front and rear derailleur cables 26, 30 are routed into the down tube 86 via a passage 138, which communicates between the head tube 82 and the down tube 86. The front derailleur cable 26 is routed from the down tube 86 into the seat tube 80 and exits the seat tube 80 via an opening 142 to be secured to the front derailleur 54 as shown in FIG. 2.

The rear derailleur cable 30 is routed from the down tube 86 into one of the chain stays 102 and exits the chain stay 102 via an opening 144 to be secured to the rear derailleur 66, as shown in FIG. 2. Routing of the control cables from inside the frame to exit points to be secured to respective components can be varied without detracting from the fundamental spirit or scope of the invention.

The apparatus allows control cables 24, 26, 28, 30 to pass along the handlebar 12, into the stem 68 and then through the stem 68, fork steerer 110, upper bearing assembly 112 and frame 14 in a manner that is unhindered and does not hinder steering or transport. It also reduces the risk of damage to the head tube 82, fork steerer 110 and cables 24, 26, 28, 30 due to improved steering capability as compared to the prior art. Variations in routing of the control cables 24, 26, 28, 30 into the fork steerer grooves can be included without detracting from the fundamental scope or spirit of the invention.

The applicant believes that the method of the current application at least partially improves on the disadvantages associated with the prior art cable routing methods. The fork steerer 110 (which is actually a single piece steerer or solid bar) is round in the areas where it interfaces with the headset bearing assemblies, thus does not require any shims or special assembly parts. Assembly of the fork 76 and stem 68 is therefore no more complex than current systems.

The angle through which the handlebar 12 is able to turn is much greater than with certain prior art, thereby reducing the risks associated with, for example, US Patent 2006/0145446 A1, as detailed above. Depending on the chosen geometry of the reduced steerer section between the upper and lower headset bearing assemblies, steering may not be limited at all. Geometry will be determined by the required strength and stiffness of the steerer tube in this section.

Furthermore, this current pending application does not reduce the strength of the handlebar as in US Patent 2006/0145446 A1 as the control cables 24, 26, 28, 30 are routed on the outside of the handlebar 12 and not through openings in the handlebar 12 itself, which weaken the handlebar 12.

As the control cables 24, 26, 28, 30 are routed in grooves and do not run over thin sections, the control cables 24, 26, 28, 30 are at less risk of being damaged by rubbing.

No additional parts are required and the possibility exists to design a head tube with further reduced frontal area.

The invention has been described in an illustrative manner. It is to be understood that the terminology, which has been used, is intended to be the nature of words of description rather than of limitation. Many modifications of the invention are possible in the light of the above teachings. Therefore, within the scope of the appended claims, the invention may be practiced other than specifically described.

The invention claimed is:

1. A bicycle having at least a portion of a plurality of control cables internally routed, the bicycle comprising
a frame, the frame including a head tube;
a fork assembly, including a fork steerer, carried by the frame; and
a cable guide positioned entirely within the fork steerer of the fork assembly, the cable guide including at least one groove adapted for receiving the portion of the control cable,
wherein the cable guide comprises a pair of spaced grooves, each for receiving a portion of one of the control cables and the grooves are provided in a head end of the cable guide, the head end comprising an upper end including a first portion of the grooves and a rear end comprising a second portion of the grooves.

2. The bicycle of claim 1, wherein the grooves are elongated.

3. The bicycle of claim 1, wherein a lower end of at least one of the grooves aligns with a hollow passageway within the frame.

4. The bicycle of claim 1, further including a stem cap including at least one protrusion adapted to protrude into the at least one groove.

5. The bicycle of claim 1, further including a stem supported by the fork assembly, the stem having an internal passageway and apertures protruding into the internal passageway for receiving a second portion of the control cable having the first portion.

6. A fork assembly adapted for routing at least one control cable of a bicycle, the fork assembly including a fork steerer comprising
an upper end of solid or partially solid geometry, adapted for routing a first portion of the at least one control cable;
an intermediate portion of reduced diameter relative to the upper end with solid or partially solid geometry, adapted to allow a second portion of the at least one control cable to exit the upper end unhindered and allow unhindered steering of the bicycle; and a lower end of solid or partially solid geometry adapted for receiving a third portion of the at least one control cable.

7. The fork assembly of claim 6, wherein the solid or partially solid geometry of the upper end of the fork steerer includes at least one groove adapted for routing a portion of the at least one control cable of the bicycle.

8. The fork assembly of claim 6, wherein the solid or partially solid geometry of the upper end of the fork steerer includes at least one internal passageway through the solid or partially solid geometry, adapted for routing a portion of a control cable of a bicycle.

9. A bicycle including the apparatus and fork assembly of claim 6.

10. A bicycle having at least a portion of a plurality of control cables internally routed, the bicycle comprising a frame, the frame including a head tube;

a fork assembly carried by the frame; and a cable guide positioned at least partially within the head tube and connected to the fork assembly, the cable guide including a pair of spaced grooves, each for receiving a portion of one of the control cables, wherein the grooves are provided in a head end of the cable guide, the head end comprising an upper end including a first portion of the grooves and a rear end comprising a second portion of the grooves.

11. The bicycle of claim 10, wherein a lower end of at least one of the grooves aligns with a hollow passageway within the frame.

12. A bicycle having at least a portion of a control cable internally routed, the bicycle comprising a frame, the frame including a head tube;

a fork assembly carried by the frame;

a cable guide positioned at least partially within the head tube and connected to the fork assembly, the cable guide including at least one groove including a portion of the cable; and a stem cap including at least one protrusion protruding into the at least one groove.

* * * * *